United States Patent [19]

Dyck et al.

[11] Patent Number: 4,777,712

[45] Date of Patent: Oct. 18, 1988

[54] APPARATUS FOR STRIPPING THE INSULATION FROM CABLES

[75] Inventors: Claus Dyck, Backnang; Reiner Rommel, Stadtallendorf, both of Fed. Rep. of Germany

[73] Assignees: ANT Nachrichtentechnik GmbH, Backnang; Wezag GmbH, Stadtallendorf, both of Fed. Rep. of Germany

[21] Appl. No.: 919,053

[22] Filed: Oct. 15, 1986

[30] Foreign Application Priority Data

Oct. 17, 1985 [DE] Fed. Rep. of Germany ....... 3536960

[51] Int. Cl.$^4$ ............................................. H02G 1/12
[52] U.S. Cl. .................... 29/566.4; 30/90.1; 81/9.4
[58] Field of Search ............... 29/566.4, 566.3, 564.6; 81/9.51, 9.4; 140/105; 30/91.1

[56] References Cited

U.S. PATENT DOCUMENTS

| | | | |
|---|---|---|---|
| 2,120,398 | 6/1938 | Edwards et al. | 30/91.1 X |
| 3,637,798 | 1/1972 | Van Dalen et al. | 30/90.1 |
| 4,449,298 | 5/1984 | Putz | 81/9.4 |
| 4,528,741 | 7/1985 | Grimsby | 29/566.4 |

FOREIGN PATENT DOCUMENTS

| | | | |
|---|---|---|---|
| 3416715 | 11/1985 | Fed. Rep. of Germany | 81/9.51 |
| 555448 | 8/1943 | United Kingdom | 81/9.51 |

*Primary Examiner*—Z. R. Bilinsky
*Attorney, Agent, or Firm*—Spencer & Frank

[57] ABSTRACT

A device for stripping the insulation from cables, including a guide block having a passage for receiving a cable and a knife bore extending transverse to, and communicating with, the passage, a knife assembly disposed in the knife bore and including a knife blade for cutting the cable insulation and a spring for urging the blade into the passage, and a handle for lifting and rotating the knife blade, associated with a lever mechanism pivotally mounted on the handle and pivotal relative to the handle in a manner to produce a lifting force which moves the knife blade in opposition to the force produced by the spring.

9 Claims, 2 Drawing Sheets

APPARATUS FOR STRIPPING THE INSULATION FROM CABLES

BACKGROUND OF THE INVENTION

The invention relates to a device for stripping insulation from cables. An apparatus of this type is described in DE-AS No. P 34 16 715.3.

In stripping the insulation from cables, it is necessary not only to cut radially into the cable jacket —and with coaxial cables, into the outer jacket and the insulator as well —but also to make lengthwise slits for easily removing the insulation. In DE-AS No. P 34 16 715.3, an apparatus has been proposed which in a simple manner permits a rotation of a knife holder and permits both radial incising and longitudinal slitting with one and the same knife blade.

The knife holder in this apparatus is under spring pressure in the direction of the cable introduction opening. Since this spring pressure is often quite high, this may present problems in moving the knife holder upward counter to the spring pressure and thus freeing the cable introduction opening so that the stripped cable can be pulled out.

SUMMARY OF THE INVENTION

It is accordingly an object of the invention to provide an apparatus in which the knife holder along with the cutting knife can be easily pulled upward counter to the spring pressure and thus free the cable.

The above and other objects are achieved, according to a device for stripping insulation from cables, which device includes a guide block having a cable introduction opening and a longitudinal bore for the cable to be stripped and a knife bore extending transverse to, and communicating with, the longitudinal bore, a cutting guide cylinder mounted in the knife bore, a cutting knife having a knife blade mounted in the cylinder and spring means between the cylinder and the knife for urging the knife toward the interior of the longitudinal bore and a turning handle secured to the knife for rotating the knife to position the blade in various angular positions about the axis of the cylinder by the improvement wherein:

the handle has a groove at the side thereof facing away from the block and extending perpendicular to the axis of the cylinder and an opening passing through the handle transverse to the groove; and the device further comprises a lever pivoted to the handle at a pivot axis proximate the pivot axis of the cylinder and extending transverse to the axis of the cylinder and a member secured to the lever and projecting therefrom and through the opening in the handle to bear against the block or the cylinder as a fulcrum so that movement of the end of the lever remote from the pivot axis of the lever toward the guide block results in movement of the knife in opposition to the spring means.

The apparatus according to the invention has the following advantages:

By simply raising the knife holder and cutting knife, which is done by depressing the lever, the cable that is to be stripped can easily be inserted into the cable introduction opening and longitudinal bore and after being worked on can easily be pulled back out again.

By means for adjusting the knife to multiple depths, a graduated stripping can be performed with the same tool; this makes the handling of coaxial cables, in particular, much easier. Moreover, cables, and in particular coaxial cables, having different diameters and/or different offset depths can be handled with the same tool. All that needs to be done is to exchange one cutting cylinder for another one having a different depth for its detent grooves. By means of a displaceable and lockable stop in the longitudinal bore, various offset depths can be set.

DESCRIPTION OF THE PREFERRED EMBODIMENTS

Figure 1:
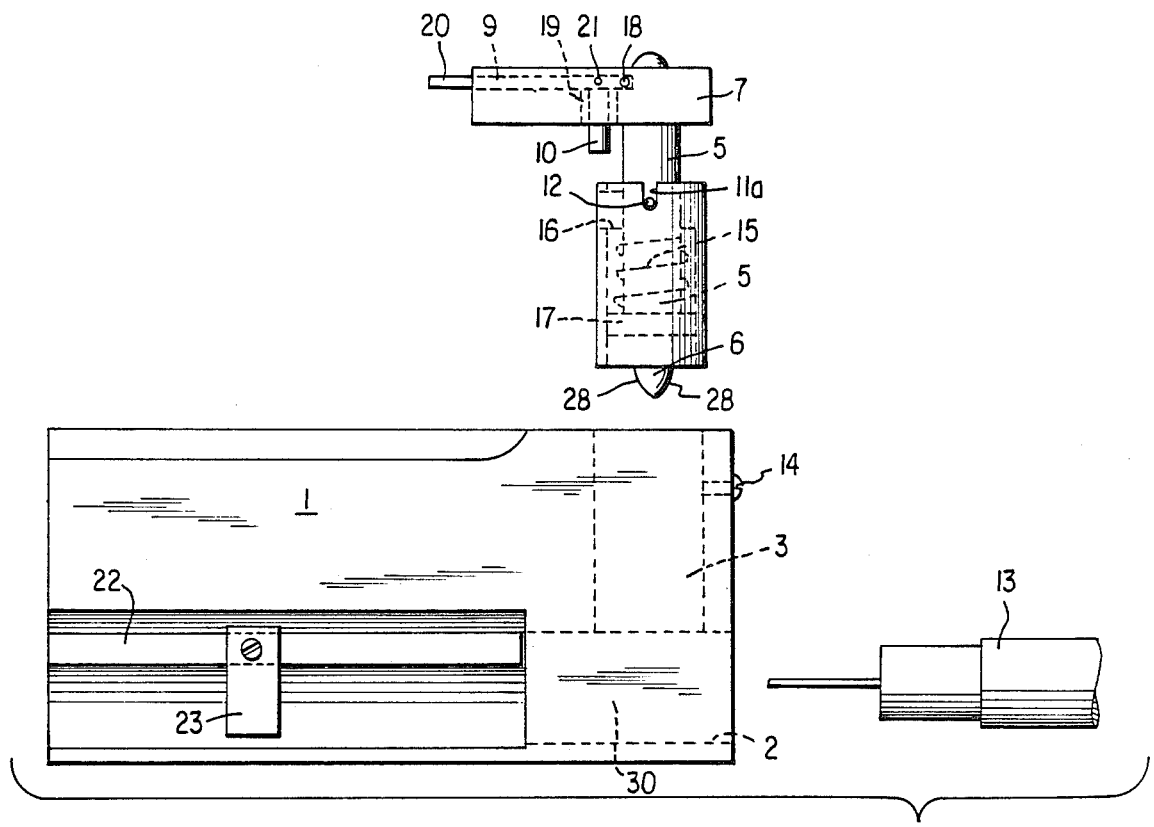
FIG. 1 is a side view of a preferred embodiment of the device according to the invention.

As FIG. 1 shows, the device for stripping the insulation from cables—in particular coaxial cables—comprises a guide block 1 having a cable introduction opening 2, and a longitudinal bore 30 which is disposed in the form of a through hole in the lower region of guide block 1, parallel to the longitudinal edges thereof. The upper and lower longitudinal edges may be smaller than the vertical front and back longitudinal edges. In the front region of guide block 1 there is a cylindrical knife bore 3, which is disposed perpendicular to the longitudinal bore 30. Knife bore 3 extends from the upper narrow side of guide block 1 as far as the longitudinal bore 30. The knife bore 3 serves to receive a likewise cylindrical cutting cylinder 4.

Figure 2:
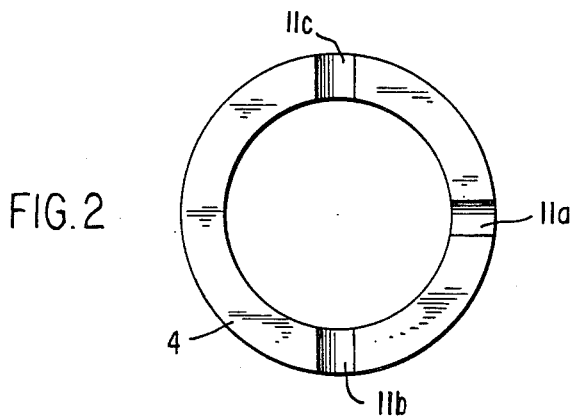
FIG. 2 is a plan view of a component of the device of FIG. 1.

Cutting cylinder 4 is shown in FIG. 1 in a side view and in FIG. 2 in a plan view. The cutting cylinder 4, which is shown separately in FIG. 1 above guide block 1, along with a knife holder 5 carrying a cutting knife 6 and a turning handle 7, can be fixed in guide block 1 by means of a screw 14. Cutting cylinder 4 has a concentric through hole, which receives both the cylindrical knife holder 5 and a compression spring 15.

The spring 15 is located between a stop 16 of cutting cylinder 4 and a stop 17 fixed to knife holder 5, and spring 15 thereby presses both knife holder 5 and the cutting knife 6, which is secured the lower end of holder 5, downward in the direction of the longitudinal bore 30.

Cutting knife 6 includes a substantially planar blade with two cutting edges 28, which are ergonometrically designed and tapered downward toward one another at an acute angle with respect to the central axis of knife holder 5 and blade 6. The blade of cutting knife 6 is preferably designed to have two parabolic contours enabling a smooth cutting into the coaxial cable.

In the upper third of knife holder 5, the latter carries a pin 12 which protrudes outward at a right angle with respect to the outer jacket of knife holder 5. This pin 12, under the spring pressure of spring 15 when turning handle 7 attached to the upper end of knife holder 5 is rotated, snaps into one of the radially extending detent grooves 11 disposed on the upper face end of cutting cylinder 4. Grooves 11 can have respectively different depths.

The detent grooves 11 have various depths so that, depending on the position of turning handle 7, pin 12 snaps into detent grooves of greater or lesser depth.

Figure 3A:
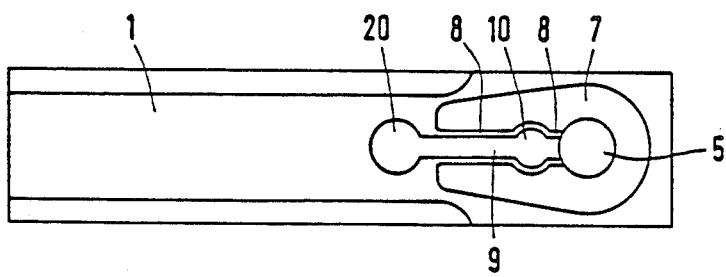
FIGS. 3a-3c are plan views showing various positions of the turning handle relative to the guide body in the apparatus of FIG. 1.
Figure 3B:
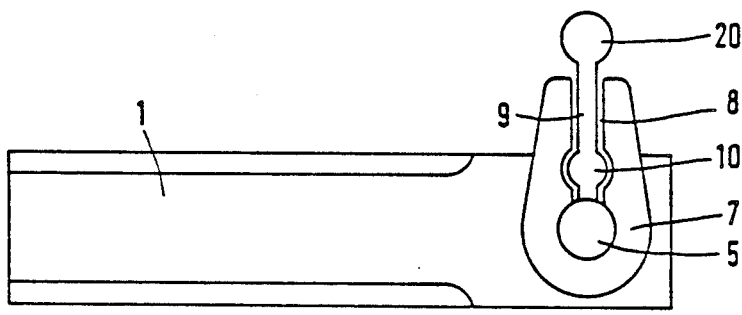
Figure 3C:
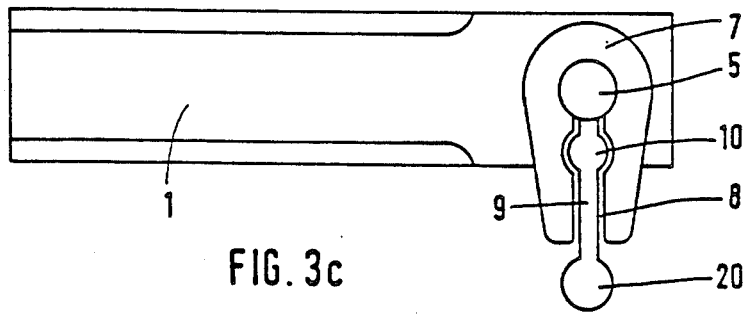

The various positions of the turning handle 7 with respect to the guide block 1 are shown in FIG. 3a-3c. In FIG. 3a, turning handle 7 extends parallel to the longitudinal dimension of the upper narrow side of guide block 1.

In that position, the pin 12 is snapped into the detent groove 11a (FIG. 2) that has the smallest depth. The cutting direction of the cutting knife 6 is parallel to the longitudinal bore 30 and enables longitudinal slitting of the cable jacket of a coaxial cable 13.

In the position shown in FIG. 3b, turning handle 7 points toward the back of guide block 1 and has been rotated by 90° relative to the position of FIG. 3a. The pin 12 has snapped into the detent groove 11b (FIG. 2), which has the same depth as the detent groove 11a. The cutting direction of cutting knife 6 is now crosswise to the longitudinal bore 30 so that the coaxial cable jacket can be cut through radially by rotating guide block 1 about cable 13.

In FIG. 3c, the turning handle 7 points toward the front of guide block 1 and the blade of cutting knife 6 is once again crosswise to the longitudinal bore 30. Now, however, the pin 12 has snapped into the detent groove 11c (FIG. 2), which is deeper than the detent grooves 11a and 11b. As a result the blade of cutting knife 6, under the spring pressure of spring 15, protrudes deeper into longitudinal bore 30 so that it can cut through both the outer conductor and the underlying insulator of the coaxial cable, by rotating guide block 1 about coaxial cable 13.

Because spring 15 must be very strong—in particular, it must not be allowed to deflect upward in response to the resistance of the cable 13—it is difficult to raise the knife holder 5 and cutting knife 6 so as to clear the cable introduction opening. According to the invention, this problem is alleviated by providing means which enable knife holder 5 to be raised in a simple manner without exerting great force.

This means comprise an additional lever 9, which is guided in a groove 8 of turning handle 7. Lever 9 is provided on one end with a pivot shaft 18 secured in turning handle 7, which permits pivoting lever 9 upward and downward into and out of groove 8. Close to pivot shaft 18, lever 9 has a protrusion 10 that projects downwardly. In the embodiment of FIG. 1, protrusion 10 is constituted by a pin. Protrusion 10 projects into a recess 19 in handle 7 so that protrusion 10 penetrates turning handle 7 and can be supported, on its end protruding below the turning handle 7, on cutting cylinder 4 or on guide block 1.

When holder 5 is in a lowered position, i.e., pin 12 is in a groove 11, lever 9 will be pivoted upwardly out of groove 8, due to contact of protrusion 10 with cylinder 4 (see FIG. 1) or block 1.

If lever 9 is then pivoted downward, the effective fulcrum of the lever 9 is no longer located at the pivot shaft 18, but rather above the protrusion 10, e.g., at point 21 in FIG. 1. Knife holder 5, along with cutting knife 6, is therefore raised, counter to the spring pressure of spring 15, as lever 9 is depressed further, thus removing the cutting knife 6 from the longitudinal bore. The exertion of force for raising the knife holder 5 counter to the spring pressure of the spring 15 is very slight, because the lever arm of the lever 9 between the fulcrum 21 and the end 20 that protrudes beyond the turning handle 7 is very much longer than the lever arm between the fulcrum 21 and the pivot shaft 18.

The apparatus can be used for stripping cables 13 of different diameters and/or different sheath and insulation depths. To this end, cutting cylinder 4 need merely be exchanged for another which has detent grooves 11 of different depths. By means of the different depths of the detent grooves 11, the cutting depth for the radial incising and longitudinal slitting is varied.

Figure 4:
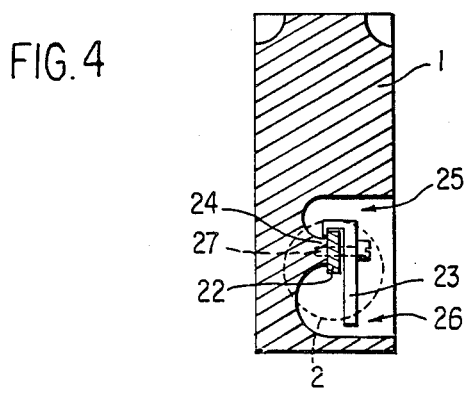
FIG. 4 is a cross-sectional view of the device of FIG. 1 in the plane of the lockable rail.

To set different stripping lengths, guide block 1 is cut open in the rear portion of the longitudinal bore 30. A stop 23 that is displaceable and lockable along a rail 22 defines the insertion depth of the cable 13. For coaxial cables 13, a plurality of such stops 23 may also be provided, so as to preset the offset length for both the inner and outer conductors. As FIG. 4 shows, rail 22 is mounted to an elevation 24 formed by a transition of two circular ending recesses 25 and 26 in guide block 1. One end of stop 23, which is formed from a flat bar, surrounds one edge of rail 22. The other end of stop 23 extends into the larger one of the two recesses so that the whole projected area behind longitudinal bore 30 is influenced by stop 23. With the aid of screw 27 stop 23 is lockable at any length of rail 22.

Figure 5:
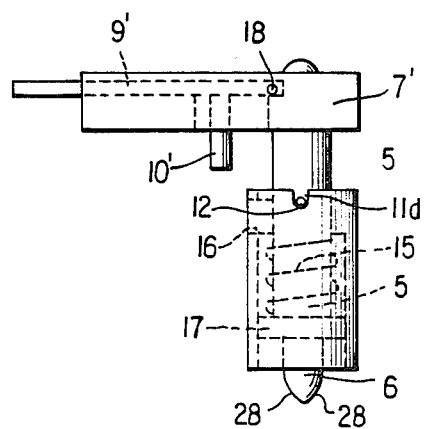
FIG. 5 is a side view of another knife holder and cylinder interchangeable in the guide block indicating different cutting depths.

FIG. 5 discloses another knife holder and cutting guide cylinder with a shorter depth of cut as shown by groove 11d. It should also be noted that the pin 10' extending from additional lever 9', which is pivoted to turning handle 7', is located to contact block 1 rather than cylinder 4 as in FIG. 1.

It will be understood that the above description of the present invention is susceptible to various modifications, changes and adaptations, and the same are intended to be comprehended within the meaning and range of equivalents of the appended claims.

What is claimed is:

1. In a device for stripping insulation from cables, comprising:
   a guide block having a cable introduction opening for the cable to be stripped, a longitudinal bore and a knife bore extending transverse to, and communicating with, said longitudinal bore;
   a cutting guide cylinder mounted in said knife bore;
   a cutting knife having a knife blade mounted in said cylinder and spring means between said cylinder and said knife for urging said knife toward said longitudinal bore; and
   a turning handle secured to said knife for rotating said knife to position said blade in various angular positions about the axis of said cylinder;
   the improvement wherein;
   said handle has a groove at the side thereof facing away from said block and extending perpendicular to the axis of said cylinder and an opening passing through said handle transverse to said groove; and
   said device further comprises a lever pivoted to said handle at a pivot axis proximate the axis of said cylinder and extending transverse to the axis of said cylinder, and means secured to said lever and projecting therefrom and through said opening in said handle for providing a fulcrum so that movement of the end of said lever remote from said pivot axis of said lever toward said guide block results in movement of said knife in opposition to said spring means.

2. A device as defined in claim 1 wherein said knife bore is perpendicular to said cable introduction opening.

3. A device as defined in claim 1 wherein said cutting guide cylinder is has, at the end thereof remote from said cable introduction opening, a plurality of detent grooves each having a respective depth in the direction of the axis of said cylinder, and said cutting knife includes a pin projecting transversely to the axis of said cylinder for engaging in a respective detent groove upon rotation of said knife, whereby said blade protrudes into said longitudinal bore by a distance which is determined by the depth of that one of said grooves which is engaged by said pin.

4. A device as claimed in claim 3 wherein said means secured to said lever comprises a member located to bear against said block.

5. A device as defined in claim 3 wherein said means secured to said lever comprises a member located to bear against said cylinder.

6. A device as defined in claim 3 further comprising at least one additional cutting guide cylinder having a plurality of detent grooves each having a respective depth in the direction of the axis of said additional cylinder, the depths of said grooves in said additional cylinder being different from those in said first-recited cylinder, said additional cylinder being mountable in said knife bore in place of said first-recited cylinder for altering the distance to which said blade protrudes into said opening to thereby adapt said device to a cable having a different diameter and/or insulation thickness.

7. A device as claimed in claim 1 wherein said means secured to said lever comprises a member located to bear against said block.

8. A device as defined in claim 1 wherein said means secured to said lever comprises a member located to bear against said cylinder.

9. A device as defined in claim 1 further comprising means defining a displaceable and lockable stop extending into said longitudinal bore for setting the extent of penetration of a cable into said opening.

* * * * *